June 8, 1937.    A. W. HAYES    2,083,017
COOKING VESSEL AND LIKE ARTICLE
Filed Dec. 29, 1936
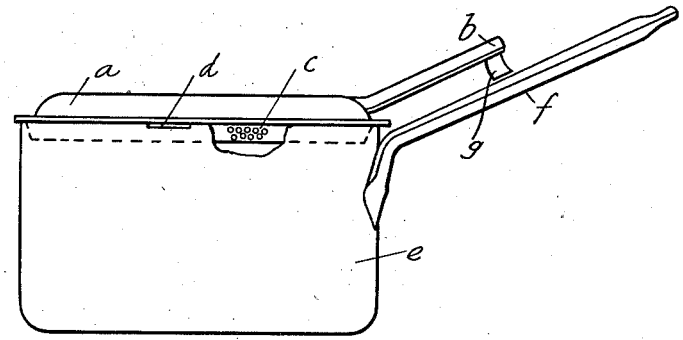
Inventor:
Alfred W. Hayes Patented June 8, 1937

2,083,017

UNITED STATES PATENT OFFICE 2,083,017

COOKING VESSEL AND LIKE ARTICLE

Alfred William Hayes, Kidderminster, England

Application December 29, 1936, Serial No. 118,103
In Great Britain January 24, 1936

1 Claim. (Cl. 53—8)

This invention relates to an improved saucepan, cooking vessel or like article of the kind having formed in the depending flange of the lid which fits within the vessel, a series of perforations or a cut-away portion adapted to be brought into register with an aperture provided in the edge of the pan at one side of the laterally-projecting handle to facilitate straining or pouring of the contents.

The improved construction according to the invention is illustrated in the drawing annexed hereto which shows such a saucepan in part vertical section. The lid $a$ has a flat top with laterally projecting handle $b$. Part of vertical flange of the lid is perforated at $c$. This portion is made to register with a lip $d$ made in the cooking vessel $e$ by turning handle $b$ in clockwise direction so that this handle is immediately above handle $f$ of the vessel. The perforated portion of lid $a$ thus made to register with the lip $d$ provides a strainer and pourer, and allows for escape of steam. When out of register steam is retained for cooking. The handle $b$ is provided with a hook for the purpose of engaging handle $f$ when the perforated portion $c$ of the lid is in register with lip $d$ of vessel.

I claim:—

An improved cooking vessel comprising in combination, an outer vessel, a handle therefor and a lid fitting into said vessel, a handle on the lid, an opening in the rim of the lid, a pouring lip on the edge of the outer vessel and a depending hook portion on the lid handle to engage with the handle of the vessel when the aforesaid opening and pouring lip register.

ALFRED WILLIAM HAYES.